United States Patent
Boutaghou

[19]

[11] Patent Number: 6,157,515
[45] Date of Patent: Dec. 5, 2000

[54] TEXTURING OF HERRINGBONE AIR AND FLUID BEARINGS

[75] Inventor: Zine-Eddine Boutaghou, Vadnais Heights, Minn.

[73] Assignee: Seagate Technology LLC, Scotts Valley, Calif.

[21] Appl. No.: 09/235,059

[22] Filed: Jan. 20, 1999

Related U.S. Application Data

[60] Provisional application No. 60/071,808, Jan. 20, 1998.

[51] Int. Cl.$^7$ .............................. G11B 17/02; F16C 32/06
[52] U.S. Cl. ....................................... 360/99.08; 384/100
[58] Field of Search ..................................... 384/100–124; 360/98.07, 99.08

[56] References Cited

U.S. PATENT DOCUMENTS 6,065,877  5/2000  Leuthold .................................. 384/278

*Primary Examiner*—A. J. Heinz
*Attorney, Agent, or Firm*—Flehr Hohbach Test Albritton & Herbert LLP

[57] ABSTRACT

A hydrodynamic bearing having two relatively rotating, substantially complementary surfaces comprising one surface on which grooves are imposed in a pattern, with unmarked portions of the surface called lands being defined between the grooves. Bumps or other texturing are imposed on the lands to reduce the contact area of the surfaces.

6 Claims, 7 Drawing Sheets

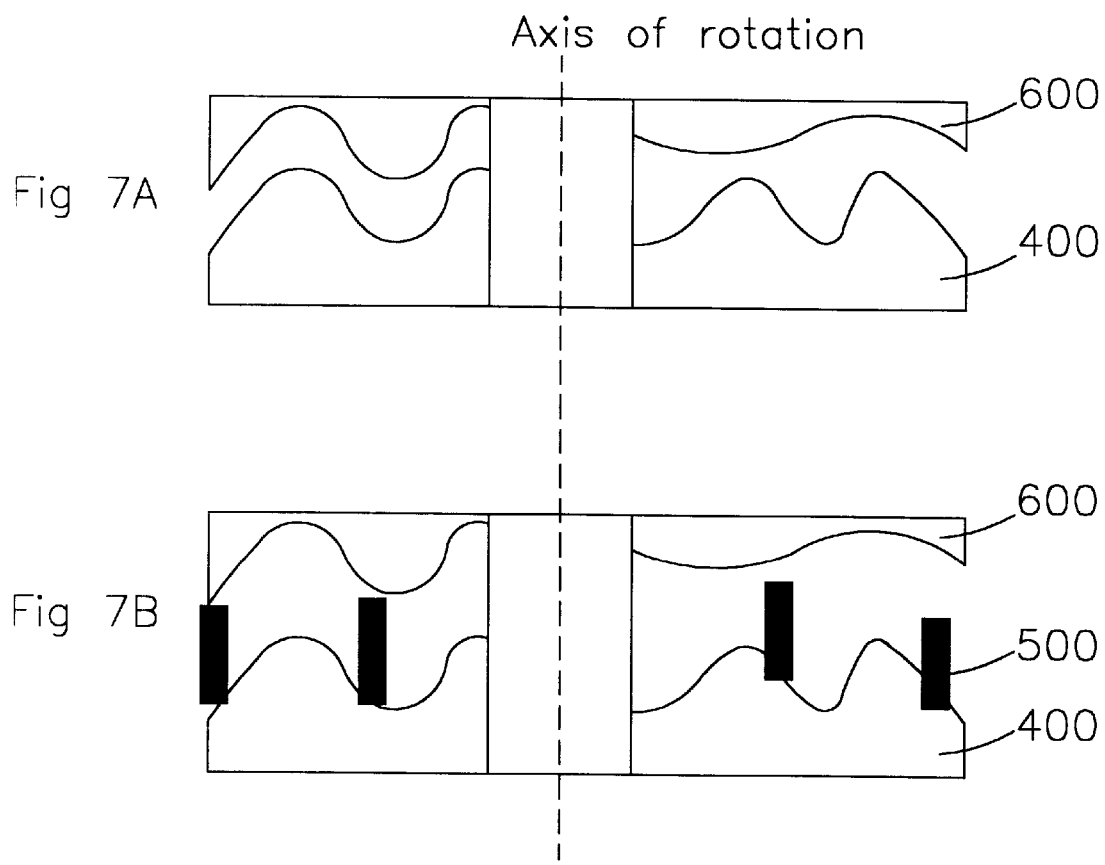
Fig 7A
Fig 7B
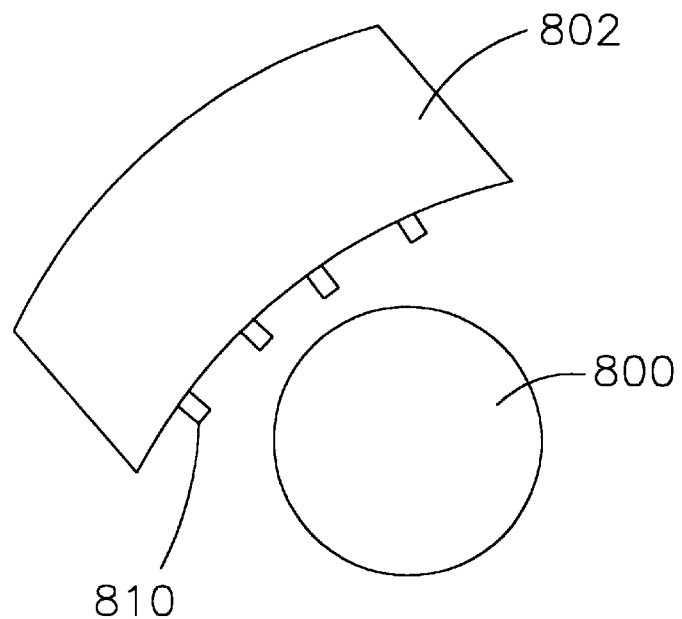
Fig 8

TEXTURING OF HERRINGBONE AIR AND FLUID BEARINGS

This application claims priority to U.S. provisional patent application Ser. No. 60/071,808, filed Jan. 20, 1998 (now abandoned).

FIELD OF THE INVENTION

The present invention relates to the field of hydrodynamic bearing assemblies, and especially to adapting such assemblies to eliminate stiction problems at startup.

BACKGROUND OF THE INVENTION

Disc drives are used for storing digital information on rotating disc or discs. In the disc drive, the discs rotate at high speed supported on the hub of a spindle motor, and a transducer flies over the surface of the disc. The transducer records and/or reads information on the disc surface. The transducer is moved radially across the surface of the disc so that the different data tracks can be read back.

Over the years, as storage density has increased and the size of the storage system has decreased, the trend has led to greater precision and lower tolerance in the manufacture and operation of disc drives. For example, to achieve increased storage densities, the transducer must be placed increasing close to the surface of the disc, and the disc must rotate in a single plane without wobble or runout in the disc rotation.

From the foregoing, it is apparent that the bearing assembly which supports the storage disc on the spindle motor is of critical importance. A typical bearing assembly comprise ball bearings supported between a pair of races which allow a hub of the storage disc to rotate relative to a fixed member. However, such ball bearing assemblies have mechanical problems such as wear, runout, and manufacturing difficulties. Therefore, an alternative design which is now being widely adopted is a hydrodynamic bearing. In a hydrodynamic bearing, a lubricating fluid such as air or liquid provides a bearing surface between a fixed member of the housing and a rotating member of the disc hub. Hydrodynamic bearings spread the bearing interface over a large surface area in comparison with the ball bearing assembly which comprises a series of point interfaces. This is desirable because the increased bearing surface reduces wobble or runout between the rotating and fixed members. Moreover, the use of fluid in the interface area imparts damping effects to the bearing which helps reduce nonrepeatable runout.

However, the same characteristics require that the gap between the rotating and the stationary surfaces be extremely small, measured in microns. The fact that these two relatively rotating surfaces are very close together, and highly lubricated, creates a stiction problem when rotation stops. That is, at startup the hydrodynamic bearing (which is also sometimes referred to as a herringbone bearing because of the patterns which are impressed on one of the relatively rotating surfaces) has the stationary and rotary surfaces which are in intimate contact. The large contact area requires a relatively large torque to overcome both the stiction forces and the frictional forces. Hydrodynamic bearing designers have been dealing with this problem by reducing the area of the herringbone, which in turn reduces the stiffness of the bearing. None of the methods used to date address the fundamental problem of decoupling the problem of stiffness from the stiction problem in the bearing land (ungrooved surface) area.

During startup of hydrodynamic bearings (also known as herringbone bearings, stepped bearings, Rayleigh bearings), the stationary and rotary surfaces are in intimate contact producing high localized stress areas due to imperfections in flatness and machining burrs and defects. As long as the Herringbone or Rayleigh steps surfaces are in intimate contact the tribological performance of the interface is going to be unreliable and very difficult to reliably produce. The field of hydrodynamic bearing design has been attempting for many years to resolve these tribological problems without success.

The present invention is intended to provide a solution to these and other problems and offers other advantages over the prior art.

SUMMARY OF THE INVENTION

The present invention relates to hydrodynamic bearings having two relatively rotating, substantially complementary surfaces comprising one surface on which grooves are imposed in a pattern, with unmarked portions of the surface called lands being defined between the grooves. Bumps or other texturing are imposed on the lands to reduce the contact area of the surfaces. The purpose of texturing one of the two contacting surfaces which form the bearing is to achieve a number of goals. First, the contact area is reduced by orders of magnitude while reducing the frictional forces which exist during startup. Secondly, by proper design of the texture on the herringbone surface, one can reduce the meniscus forces acting on the median surfaces. Finally, performance of the interface can be improved by reducing the sheer forces acting on the bearing interface in startup.

Other features and advantages of the present invention will become apparent to a person skilled in the art who studies a preferred embodiment of the present invention given with reference to the attached figures.

BRIEF DESCRIPTION OF THE DRAWINGS

FIGS. 7A and 7B illustrate the current configuration of two hydrodynamic surfaces at rest; in this case, two thrust plates forming a thrust bearing are shown. FIG. 7B illustrates the application of bumps to one of the thrust plate surfaces;

FIG. 8 illustrates a potential alternative embodiment of the present invention.

DETAILED DESCRIPTION OF A PREFERRED EMBODIMENT

Figure 1:
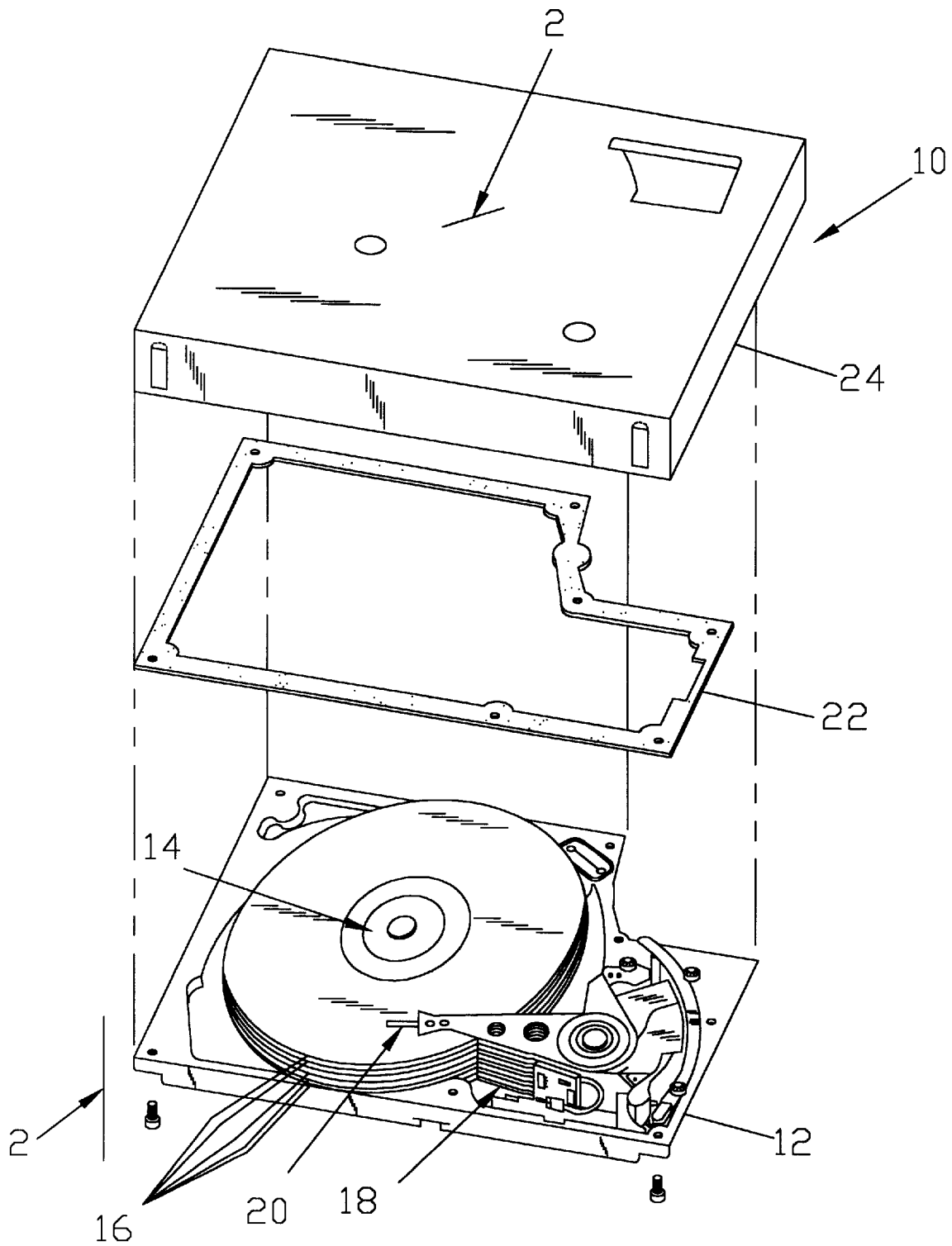
FIG. 1 is a perspective view of a disc drive in which a spindle motor incorporating the hydrodynamic bearings of the present invention is useful.

FIG. 1 is an exploded perspective view of a disc storage system in which the present hydrodynamic bearing incorporating principles of the present invention could be used. In the example to be discussed below, the use of the hydrodynamic bearing is shown in conjunction with a spindle motor supporting one or more discs. Clearly, this bearing is not limited to use with a particular design of the disc drive which is shown only for purposes of the example. The bearing has many uses in all types of spindle motors and many other uses outside the field of disc drives.

Further, the fluid bearing disclosed herein has a fixed shaft and rotating surrounding sleeve. The design is equally useful where the shaft rotates and the sleeve is fixed.

In this particular example, the data storage system 10 includes a housing base 12 having a spindle motor 14 which carries a storage disc or discs 16. An armature assembly 18 moves transducers 20 across the surface of the disc. The environment of disc 16 is sealed by seal 22 and cover 24. In operation, the discs 16 rotate at high speed while the transducers 20 are positioned at any one of a large number of radially differentiated tracks on the surface of the disc. This allows the transducers to read and write magnetically coded information on the surfaces of discs 16 at selected locations. The discs are rotated at very high speeds, several thousand RPM at constant speed to maintain the transducers flying over the surfaces of the disc or discs. As the disc drive will not allow reliable data access without this constant, high speed data rotation, it is essential that the spindle motor which causes the disc rotation is able to start up quickly and rotate smoothly.

Figure 2:
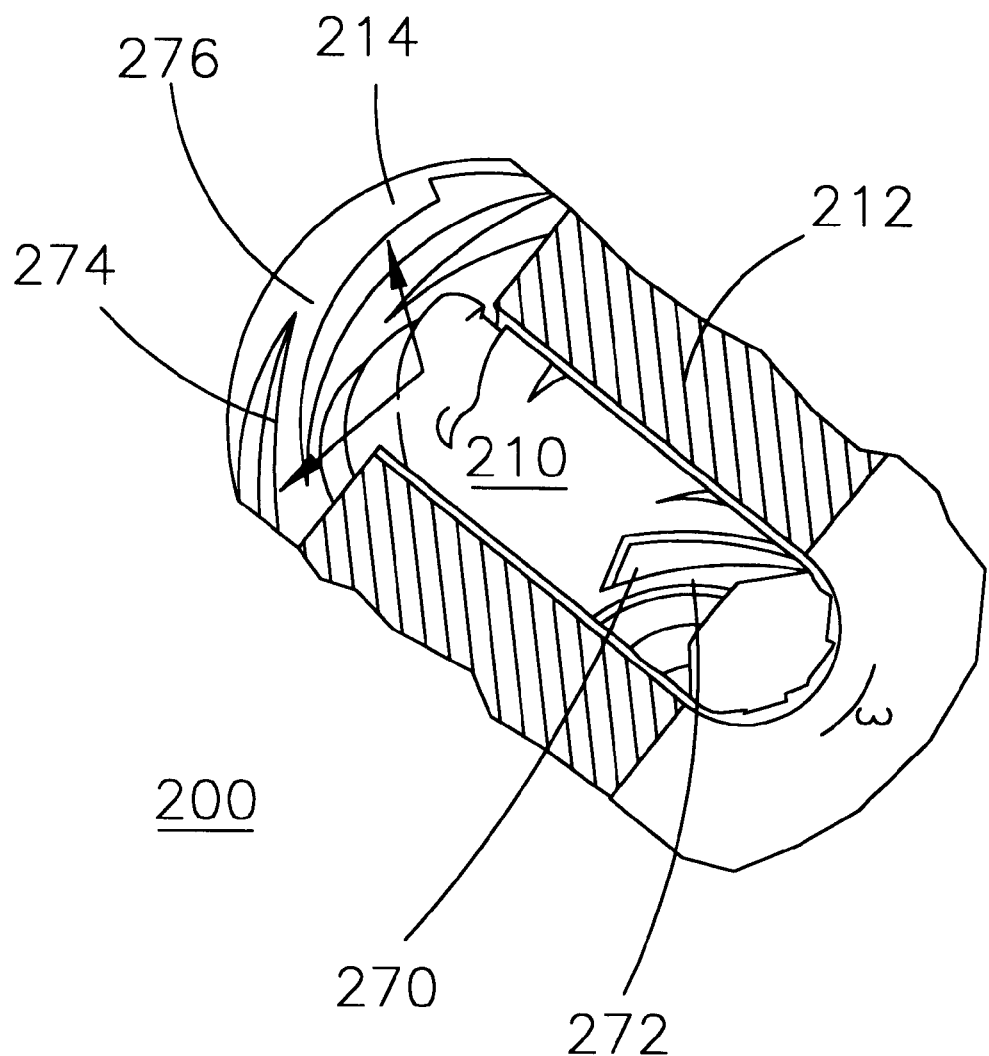
FIG. 2 is a sectional view illustrating some of the basic principles of a hydrodynamic bearing.

A sectional schematic view of the basic elements of a hydrodynamic bearing which may be used to support the hub of a spindle motor for such constant speed rotation is shown in FIG. 2. As shown in this figure, the hydrodynamic journal bearing includes a shaft 210 which is rotating relative to a bushing or sleeve 212 with one of the opposing two surfaces (in this case, shaft 210) carrying cylindrical sections of grooves 270 separated by lands 272. A thrust plate 214 is provided at or near one end of the shaft 210 to carry substantially concentric spiral groove sections 274 separated by lands 276 either on the plate 214 itself or on the sleeve surface or counterplate 212 that it faces. The relative rotation of the shaft and sleeve pumps the fluid as a function of the direction with an angle of the grooves relative to the sense of rotation. This pumping action builds up one or more pressure zones along the journal defined between shaft 210 and sleeve 212, and between the thrust plate 214 and the sleeve 212 or counterplaint that it faces. This maintains the fluid film between the relatively rotating parts, and provides the desired stiffness for the bearing. Such a bearing only works successfully if the gap between shaft and sleeve and counterplate and thrust plate is very small, measured in microns. Thus, when the motor stops rotating, and the shaft comes to rest, substantial stiction forces could be created between what are, in operation, the relatively rotating parts. These forces are especially created between the ungrooved surfaces or lands which exist between each of the grooves, and the surfaces they face as it is here that the gaps are smallest, and two exceptionally smooth surfaces are in very close contact.

Figure 3:
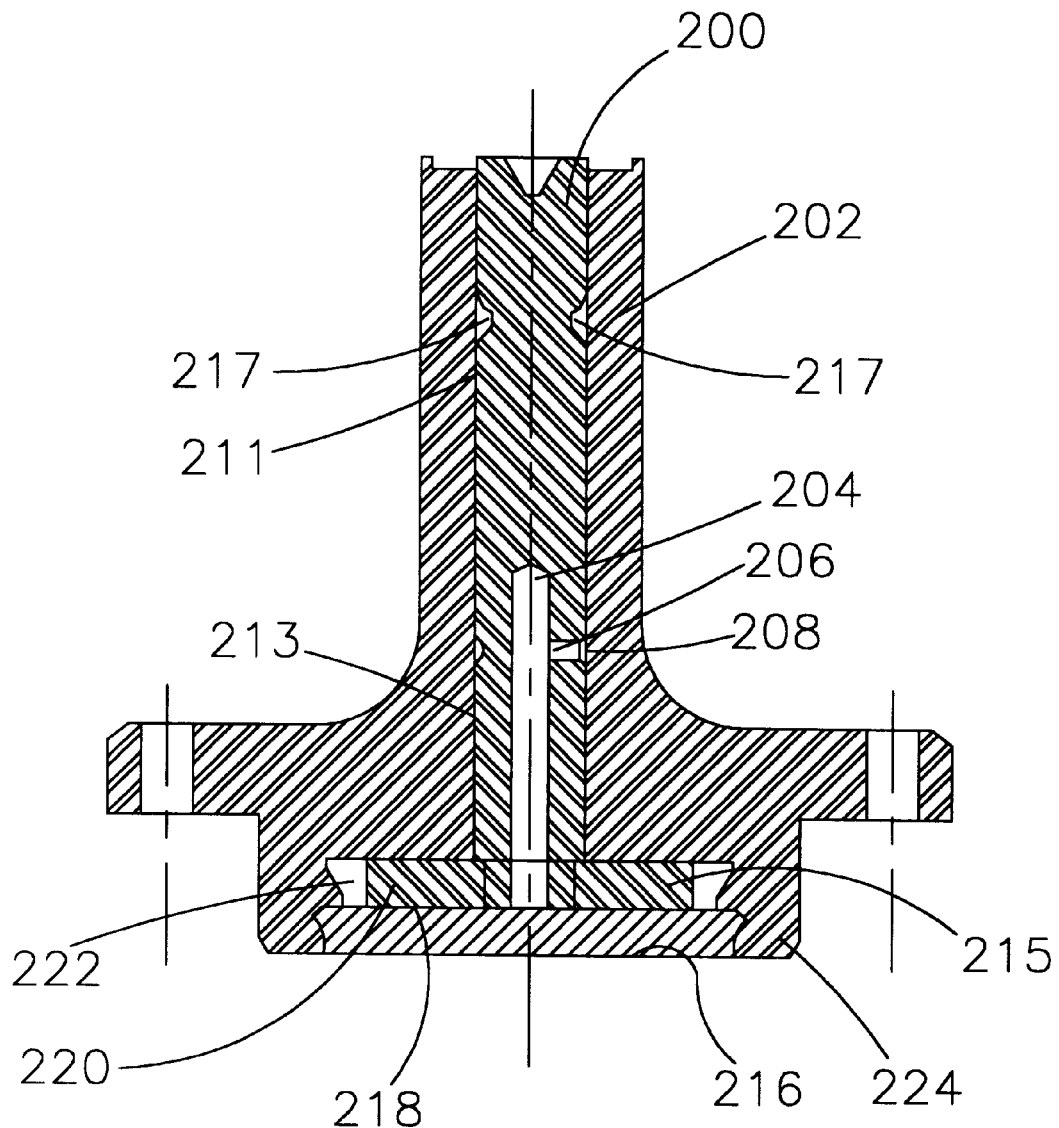
FIG. 3 is a sectional view of a spindle motor having a hydrodynamic bearing in which the present invention is useful.

A typical spindle motor in which such a rotating shaft hydrodynamic bearing may be incorporated is shown in FIG. 3.

The hydrodynamic bearing based motor of FIG. 3 also includes a rotating shaft 200 which in this embodiment is a straight stem rising up through a sleeve 202. The rotating shaft includes a fluid reservoir 204 connected through a bore 206 and equipressure groove 208 to the facing surfaces of the rotating shaft 200 in sleeve 202 which form the hydrodynamic journal bearings. In this embodiment, chevron patterns in the regions 211, 213 form journal bearings above and below the equipressure groove. The upper bearing to region 211 extends up to a region 217 where the surface of the rotating shaft angles away from the facing surface of the sleeve. A small shoulder 215 in the sleeve faces the notch 213 formed in the rotating shaft 200. This allows the formation of a capillary seal at the lower portion of the notch 217 extending from the rotating shaft across to the interior surface of the sleeve so that fluid cannot escape above this region.

The lower journal bearing 213 extends substantially down to a thrust plate 215 where the shaft terminates, with the reservoir 204 extending down through this thrust plate. A counterplate 216 faces the bottom surface of the thrust plate 215. In a preferred embodiment, the chevron or herringbone patterns which are needed to establish the proper pressure distributions across the hydrodynamic bearing are formed on the upper surface 218 of this counterplate, facing the flat bottom surfaces of the thrust plate 215. Herringbone or chevron patterns are also formed on the upper surface 220 of the thrust plate facing the top surface of the recess 222 in which the thrust plate rotates so that both upper and lower thrust bearings are formed to enhance the lateral and axial stability of the rotating shaft in the hydrodynamic bearing.

Figure 4:
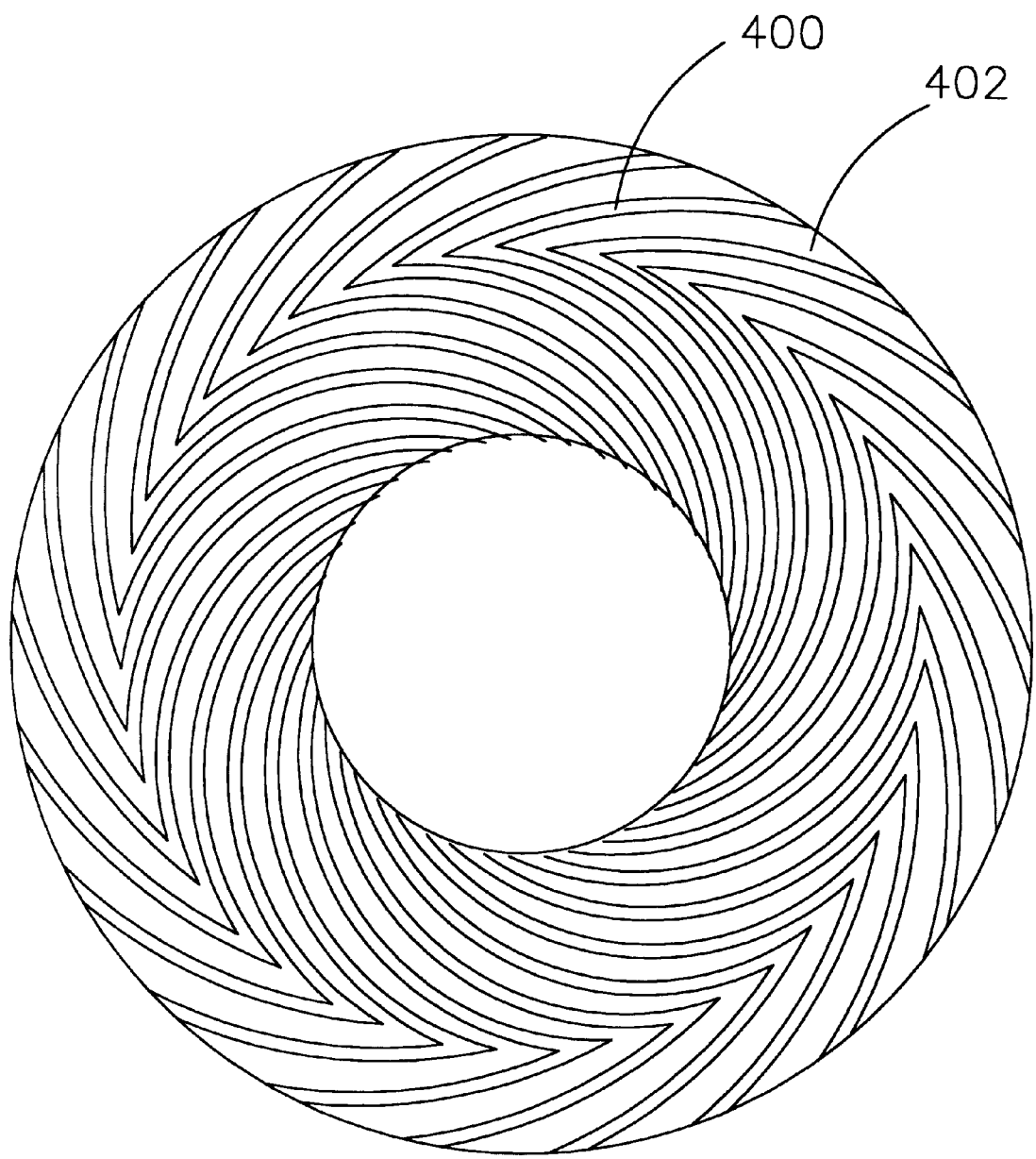
FIG. 4 is a plan view of a thrust plate incorporating bearing grooves and lands in which the present invention is useful.

It should be apparent that either the shaft or the thrust plate or, in certain instances both, could come to rest against the facing counterplate or sleeve. The flat surfaces of the lands between the grooves would be resting against the facing surfaces, producing a large contact area which requires a relatively large torque to overcome both the stiction forces and the frictional forces. To be sure that the motor started every time, the motor would have to incorporate enough power to overcome these stiction and friction forces, even though the power would not be needed during the rest of the operation period of the motor. Thus, it would be quite inefficient to design such a motor. Referring to FIG. 4 which shows a pattern of grooves 400 separated by lands 402 of a type which would be utilized on the thrust plate 215 or facing counterplate 216 in the motor of FIG. 3. It can be seen from FIG. 4 that there is a substantial landed area in the bearing, producing a serious problem in decoupling the two relatively rotating pieces upon startup.

Figure 5A:
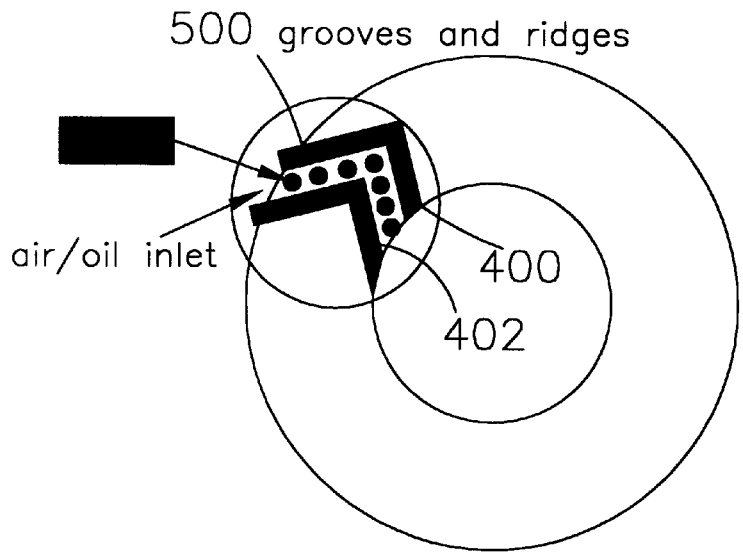
FIG. 5A is a plan view of a thrust plate on which the bumps or texturing of the present invention is incorporated.
Figure 5B:
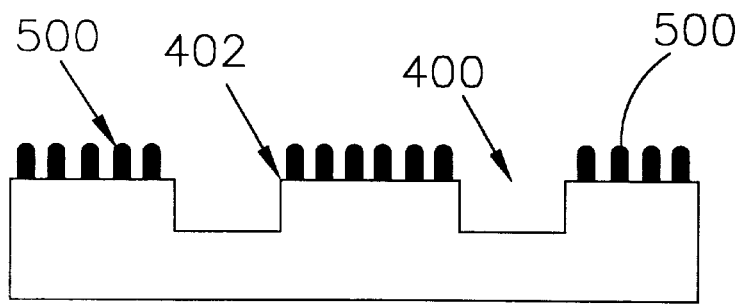
FIG. 5B is a vertical sectional view of the thrust plate of FIG. 5A.
Figure 5C:
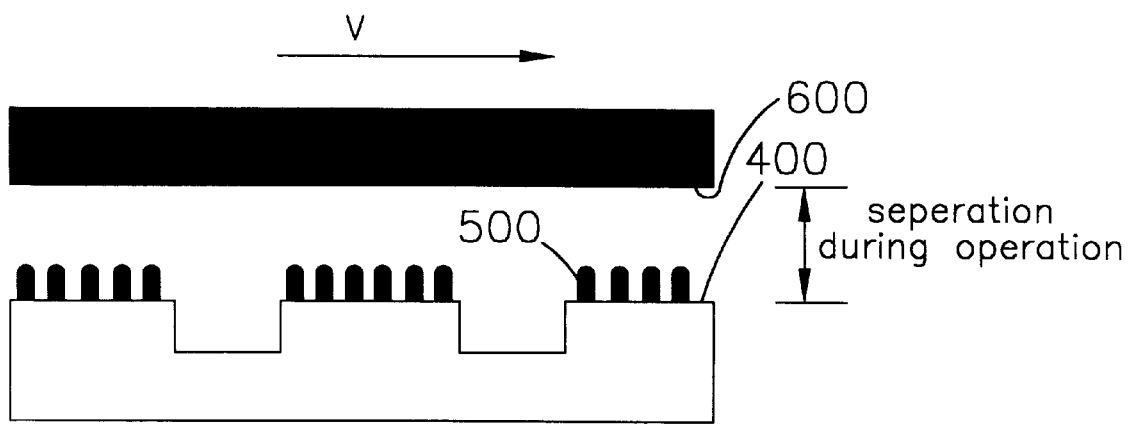
FIG. 5C is a vertical sectional view of the thrust plate and associated counterplate in a hydrodynamic bearing of the type used in the present invention.

Referring next to FIGS. 5A through 5C, these figures show, primarily in a schematic form, the solution proposed according to the present invention. According to FIG. 5A, which is a partial plan view of a thrust plate such as shown in FIG. 4, between each of the grooves 400, in the land area 402, a pattern of bumps 500 is provided. These bumps may be provided either by laser texturing, forming, or deposition on the lands of the herringbone air bearing surface. These bumps (which are also shown in vertical section in FIG. 5B) or similar texturing on the surface of the lands, provide the advantages of establishing a clearance between the rotating and stationary surfaces, as well as interrupting the contact area between the lands and the associated surface. They are especially useful in reducing the meniscus forces acting on the facing, mating surfaces as well as improving the wear performance of the interface by reducing the shear forces acting on the interface during any start-up. The size of the bumps or protrusions relative to the total gap between the facing surfaces is shown schematically in FIG. 5C and should ideally occupy less than half of the total gap between the land surface 402 and the facing surface 600 so that the efficient operation of the land in establishing the pressure and thereby maintaining the support for the system is not diminished by provision of the bumps or other protrusions.

With proper formation and deposit, the bumps could also play a roll in debris formation and debris collection as well as minimizing friction and controlling stiction between the surfaces of the land 400 and the cooperating surface 600.

Figure 6:
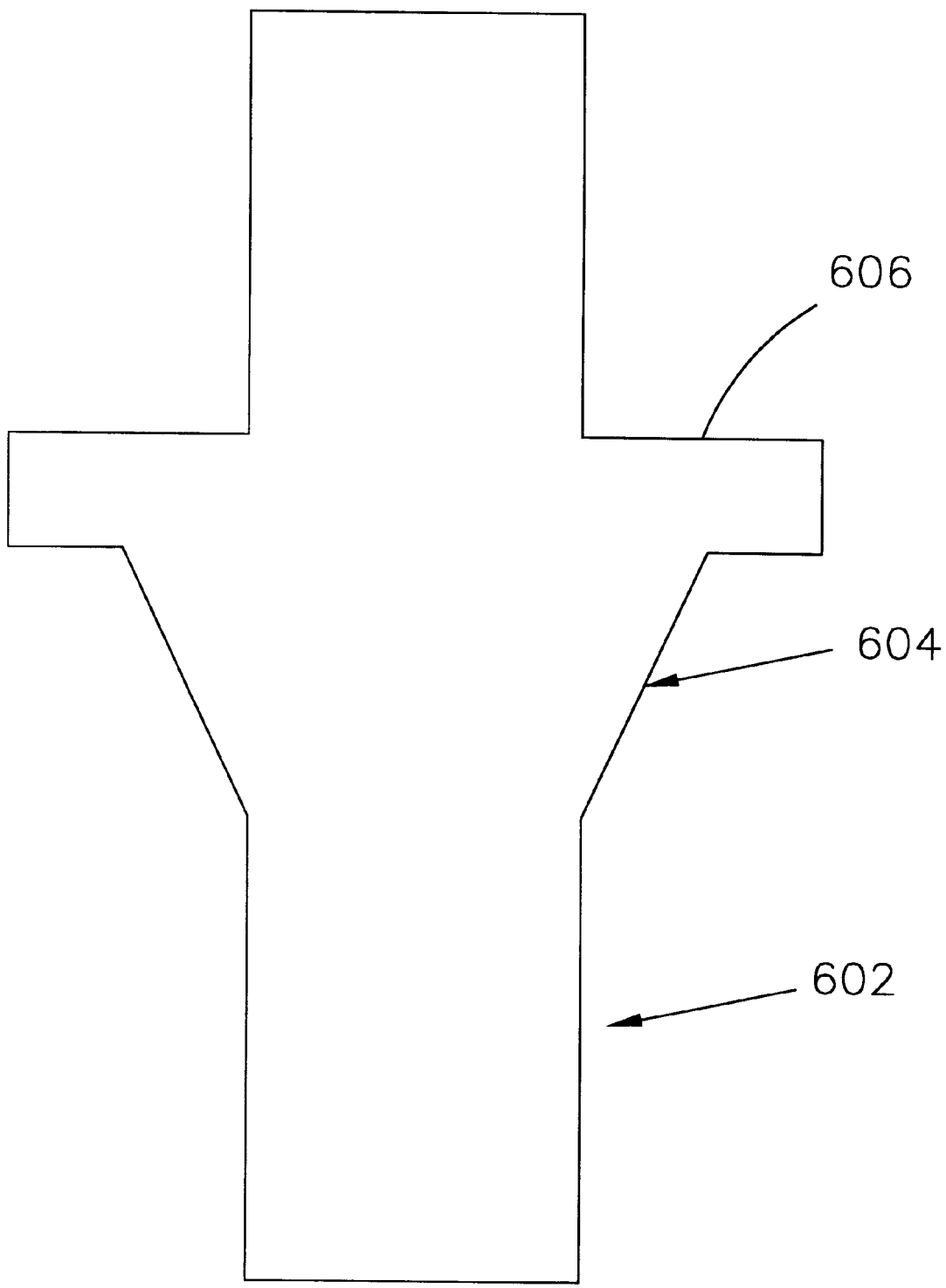
FIG. 6 is a perspective view of a conical bearing of a type in which the present invention may be useful.

A further example of a bearing to which the present invention may be applied appears in FIG. 6. In this figure, the pattern of grooves and lands could be applied to the shaft region 602, and/or the conical region 604 or the radial thrust plate 606. Any of these could come to rest substantially flat against the complementary relatively rotating surface area, creating substantial stiction and friction forces to be overcome on start-up. Thus, the present invention of establishing bumped or textured regions on the lands of any of these areas would have substantial benefit.

A further advantage of the present invention is that it helps with problems created by the imperfections in the facing surfaces of the hydrodynamic bearing. As noted above, the gap between the two surfaces of the hydrodynamic bearing is very small, measured in microns. Therefore, imperfections in the flatness of the surface, including machining burs and other defects, create friction which can impede the startup process.

According to the present invention, the bumps which are formed on at least one surface comprise diamond-like carbon or equivalent material with sufficient height to prevent the facing surfaces of the hydrodynamic bearing to be in direct contact when the surfaces are at rest. Therefore, the bumps 500 which are shown in FIG. 7B could be deposited on either the rotor or stator surfaces; the preferred form of the bumps is not at issue. The major requirement is that they be of sufficient height to ensure that there is positive clearance between the rotor and stator during static conditions. A comparison of FIG. 7A which shows the rotor and stator 400, 600 in a highly exaggerated form shows that clearly in the left-hand portion there would not be positive clearance when the bearing elements are at rest. Therefore, the modification illustrated in FIG. 7B which shows the addition of the pads or bumps 500 of sufficient height to compensate for the curvature or unevenness inherent in machine surfaces is provided. This addition establishes that the static spacing between the two surfaces is positive when the surfaces are at rest. The added bumps prevent the two surfaces 400, 600 from contacting. The takeoff process relies mainly on the air fluid bearing formation, and not on the material composition of the plates.

The formation of the bumps has been described above with respect to FIGS. 5A–C. The same process could be applied to either thrust plate bearings or journal bearings. Journal bearings would probably have three to four rows of bumps deposited along the axis of rotation.

In addition to the thrust bearings and journal bearings defining hydrodynamic bearings, the present invention can potentially be applied to other fields of endeavor. For example, in ball socket systems, such as in knee replacements, and potentially some automotive joints, such ball socket systems may now or in the future operate in a boundary lubricated regime where the hydrodynamic film thickness is smaller than the compound average roughness of the contact system. Such systems undergo a lot of wear during the break-in regime since debris is known to cause a breakdown of the lubricant by generating Lewis acids. Thus, the diamond-like carbon (DLC) bumps or pads could be utilized to separate the interacting surfaces of such ball docket joint and avoid wear of the boundary lubricated interface. An example is shown in FIG. 8, where a ball 800 rotates within a socket 802 separated by only an extremely narrow gap whose width is measured in microns. The pads or bumps 810 could be deposited either on the ball 800 or the socket surface 802. From a manufacturing viewpoint, the socket would be a preferred area; from a tribological viewpoint, the ball would be a better placement to distribute the wear. The pads or bumps could be designed not to interfere with the function of the system during establishment of the fluid film, with the pads or bumps being invoked during the boundary lubrication regime only.

Another advantage of the use of the protrusions or bumps is that it allows the use of dissimilar materials for the rotor and stator.

Other features and advantages of this invention will be apparent to a person of skill in the art. Therefore, the scope of this invention is to be limited only by the following claims.

In the claims:

1. A hydrodynamic bearing comprising first and second relatively rotating surfaces and a fluid film between said rotating surfaces for supporting said surfaces for rotation, at least one of said surfaces comprising adjacent grooves and lands, said lands having a plurality of bumps or other textures thereon to provide clearance between said relatively rotating surfaces.

2. A hydrodynamic bearing as claimed in claim 1 wherein one of said relatively rotating surfaces is a shaft and the other of said surfaces is a sleeve and said lands and said bumps are formed on one of said shaft and said sleeve.

3. A hydrodynamic bearing as claimed in claim 1 wherein said relatively rotating surfaces are fairly complementary, conical surfaces one of said surfaces including said lands having said bumps thereon.

4. A spindle motor adapted for use in a disk drive and including a shaft and a sleeve surrounding said shaft, one of said shaft and said sleeve supporting a hub for rotation and having one or more disks supported thereon, said shaft and said sleeve being adapted for relative rotation and finding a hydrodynamic bearing therebetween, complementary facing surfaces of said shaft and said sleeve having a pattern of grooves and intermediate lands defined thereon, said lands having bumps on a surface thereof facing said other surface to reduce friction between said surfaces and provide clearance between the relatively rotating surfaces during stopping.

5. A spindle motor as claimed in claim 4 wherein said shaft has a thrust plate mounted thereon, having said thrust plate having surfaces extending radially away from said shaft and cooperating with said sleeve or a counterplate supported on said sleeve to define a hydrodynamic bearing gap, fluid being incorporated into said gap to support relative rotation between said shaft, said thrust plate and said cooperating sleeve and counterplate, and wherein one of said shaft and said thrust plate or said sleeve and said counterplate have one or more patterns of grooves and intermediate lands thereon, said lands having bumps to interrupt said flat surfaces of said lands to reduce friction and meniscus extablished between said relatively rotating surfaces.

6. A spindle motor as claimed in claim 4 wherein said bumps are formed by a process chosen from laser texturing, forming, or deposition.

* * * * *